United States Patent [19]

Soriente et al.

[11] Patent Number: 4,889,624
[45] Date of Patent: Dec. 26, 1989

[54] LAMELLA GRAVITY SEPARATOR

[75] Inventors: Alfonse J. Soriente, Westfield; Lawrence Gurnari, Morganville, both of N.J.

[73] Assignee: The Graver Company, Union, N.J.

[21] Appl. No.: 294,287

[22] Filed: Jan. 6, 1989

[51] Int. Cl.$^4$ .............................................. B01D 21/02
[52] U.S. Cl. ..................................... 210/232; 210/519; 210/522; 210/532.1
[58] Field of Search ............... 210/232, 519, 521, 522, 210/532.1, 802

[56] References Cited

U.S. PATENT DOCUMENTS

| | | | |
|---|---|---|---|
| 3,552,554 | 1/1971 | Olgard | 210/519 |
| 3,706,384 | 12/1972 | Weijman-Hane | 210/519 |
| 3,894,955 | 7/1974 | Forsell | 210/322 |
| 4,290,898 | 9/1981 | von Hagel | 210/738 |
| 4,681,683 | 7/1987 | Lindstol | 210/521 |

OTHER PUBLICATIONS

Publication Entitled "Lamella Gravity Settlers", by Axel Johnson Industries Ltd.
Publication Entitled "Liquidsolidseparation in the Seventies", by Parkson Corporation.
Publication Entitled "Lambella Separator Clarifier/Thickener", by Ecodyne Industrial Waste Treatment Division.

Primary Examiner—Richard V. Fisher
Assistant Examiner—Christopher Upton
Attorney, Agent, or Firm—Dressler, Goldsmith, Shore, Sutker, & Milnamow, Ltd.

[57] ABSTRACT

A lamella separation apparatus comprising a liquid receiving tank having a lamella plate assembly supported therein defining flow passages between adjacent lamella plates. The lamella plates have a generally rectangular inclined settling surface and rear surface and a leg portion extending perpendicular to an upper portion of the rear surface along the entire width thereof. The leg portion extends between adjacent lamella plates in closing relationship to the corresponding flow passage therebetween. A plurality of horizontally spaced orifices extend through the lamella plates at an elevation a small distance below the elevation of the leg portion in communication with a corresponding flow passage for directed clarified liquid therethrough into an area above the lamella plate assembly. The orifices are sized so as to create a small pressure drop across the orifices to ensure substantially equal flow distribution through the flow passages. The lamella plates have spacer lugs at the lower and central portions thereof and are individually removable from the lamella plate assembly.

14 Claims, 3 Drawing Sheets

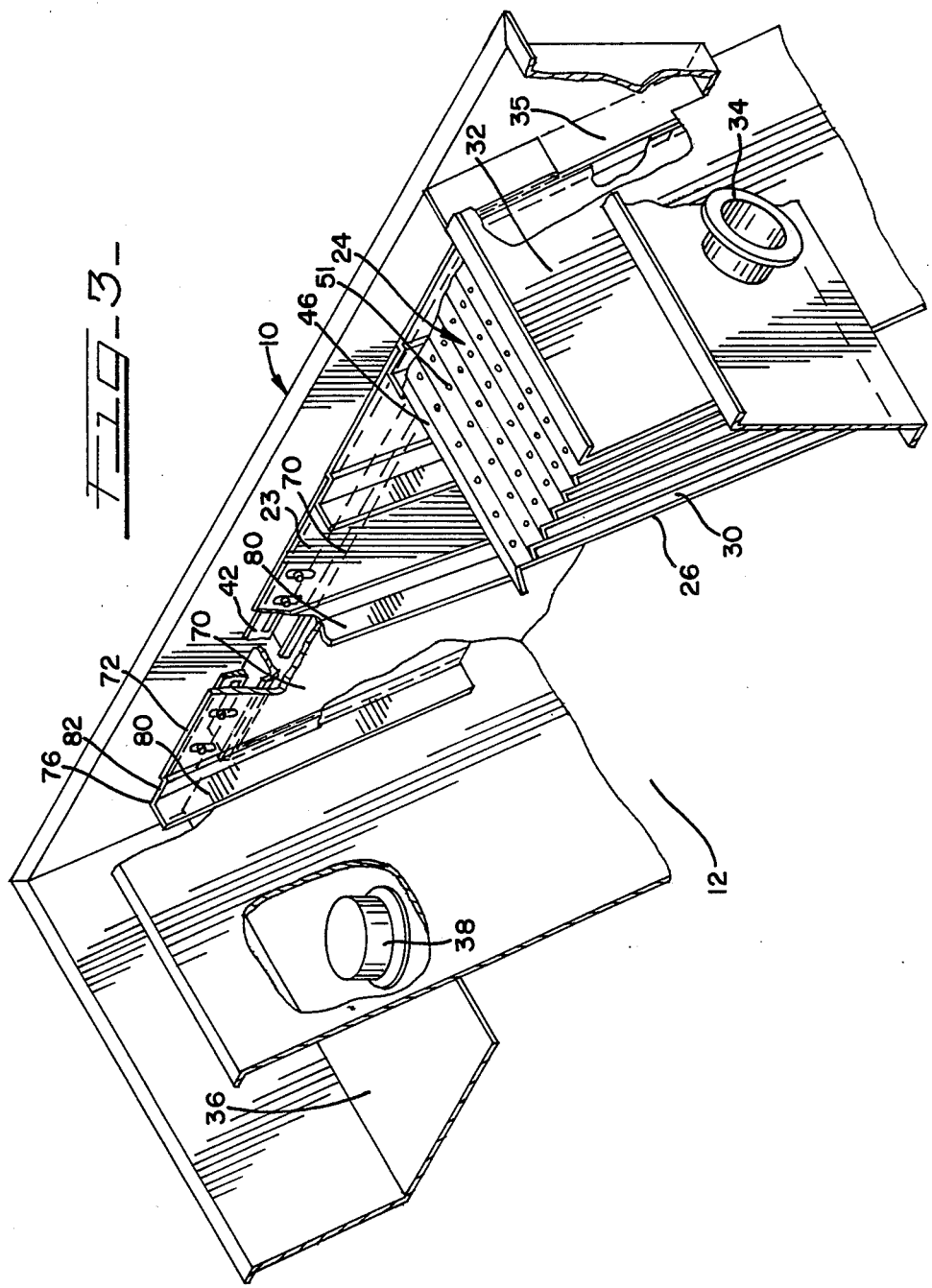

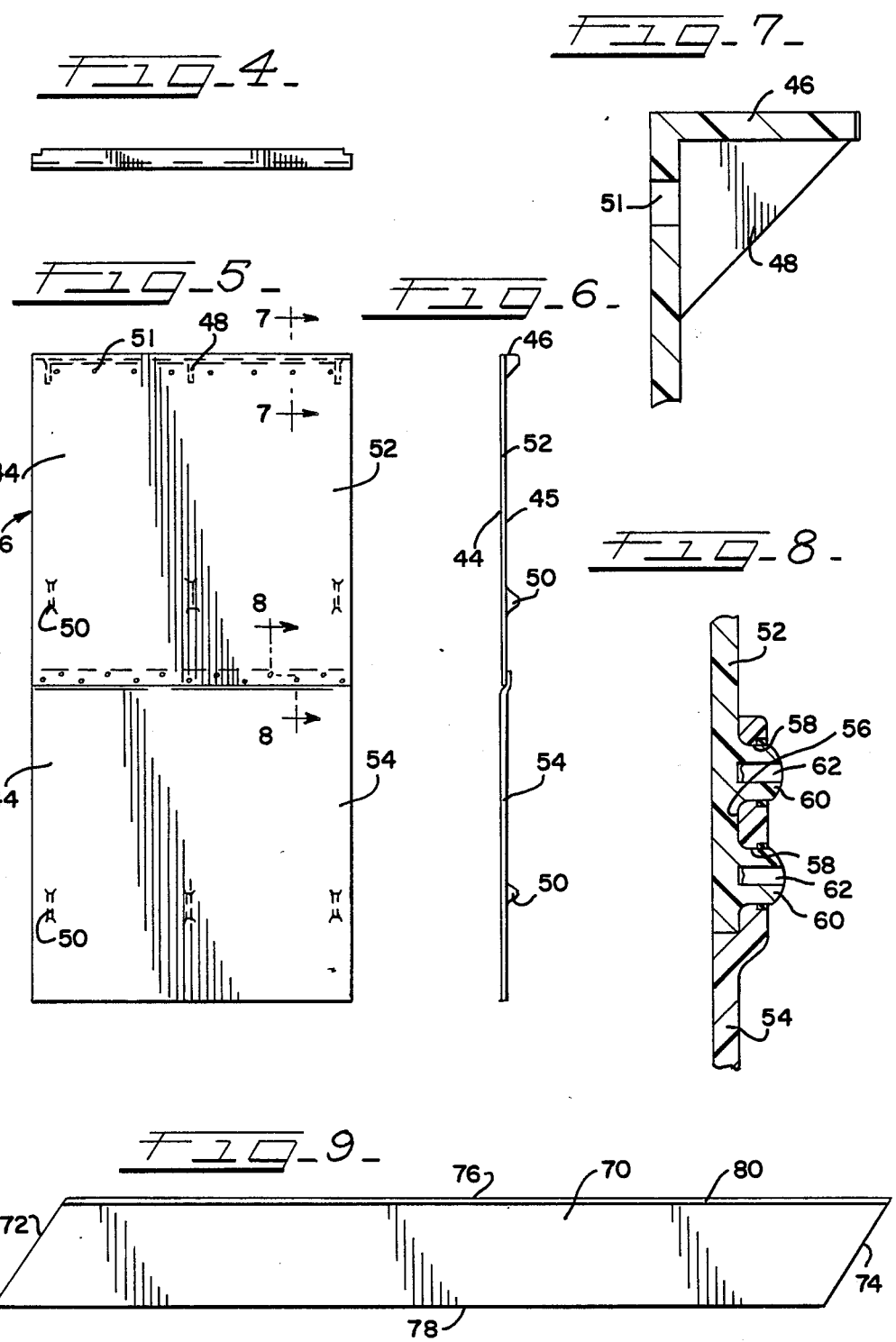

LAMELLA GRAVITY SEPARATOR

BACKGROUND OF THE INVENTION

The present invention generally relates to apparatus for separation of solids suspended in a liquid and, more particularly, to an improved lamella-type gravity separator.

Sedimentation basins and clarifiers have been used for many years to separate solids suspended in water and wastewater. They started out as simple concrete or steel tanks where water containing suspended solids flowed in, was retained for a predetermined length of time, and departed, substantially free of suspended solids. Various advancements were made over the years to increase the efficiency of such apparatus; including the incorporation of sludge removal mechanisms, flocculators and sludge recycle mechanisms. More recently, inclined tube settlers of various designs have been installed in such apparatus to increase the surface loading rate.

In recent years the separation art has directed much attention to lamella separation. Lamella separation separates solids from a carrying liquid by directing the liquid between series of inclined plates (lamellae). The effective settling area of each lamella plate is equivalent to the horizontal projection of that lamella plate. Lamella plates are typically spaced a few inches apart, with the result that large settling surfaces are concentrated within a relatively small area. The separated particles settling on the inclined lamella plate slide down into a sludge hopper below the lamella plates. The lamella separation promotes laminar and stable flow conditions throughout the apparatus, which leads to a very high degree of separation.

Lamella separator apparatus are classified into three main categories based on flow regimes in the unit: namely (1) countercurrent, wherein the suspension and the liquid flows are countercurrent to the sludge flow; (2) concurrent, wherein the suspension and the liquid flow are concurrent to the sludge flow; and (3) crosscurrent, wherein the suspension and the liquid flow are at right angles to the sludge flow. As the art has developed, it has been generally recognized that the countercurrent flow regime is the best, as well as the least expensive, both in installation and operation.

In optimizing the design of lamella separator apparatus, there are many design variables which cooperate with one another in determining the efficiency and reliability of the apparatus. These variables include the cooperation between the inlet and outlet assemblies and the lamella plate assemblies. In optimizing these variables, it is desirable to maximize effective use of the projected lamella area, while preventing sludge that has already settled from being re-entrained in the liquid flow. Further, in order to maximize utilization of the lamella settling surfaces and achieve the greatest possible efficiency, it is important that each lamella flow passage be given a substantially equal hydraulic load.

Another important consideration which must be addressed in designing a lamella separator is the ability to maintain the apparatus. Experience has indicated that it is periodically necessary to perform maintenance to the lamella plates and/or to replace them. Accordingly, it is desirable to be able to perform such maintenance and/or replacement without materially interfering with the operation of apparatus.

Examples of heretofore proposed designs of lamella separator apparatus are disclosed in U.S. Pat. Nos. 3,552,554; 3,706,384; 3,894,955; 4,290,898 and 4,681,683. The present invention is directed to improve upon the operational efficiency and the maintenance of such designs.

SUMMARY OF THE INVENTION

The lamella separation apparatus, in accordance with a preferred embodiment of the invention, includes a liquid receiving tank defined by side walls, end walls and a floor. A lamella plate assembly is supported within the tank comprising a plurality of spaced-apart inclined lamella plates that define flow passages therebetween. An inlet distribution means directs liquid to be treated into the tank and upwardly through the flow passages. An outlet trough means extends transversely with respect to the flow passages for receiving clarified liquid from the flow passages.

In accordance with a preferred embodiment of the invention, the lamella plates have generally rectangular inclined settling surfaces and rear surfaces and a leg portion extending substantially perpendicular to an upper portion of the rear surface along the entire width thereof. The leg portion extends between adjacent lamella plates such that the outer edge thereof contacts a rear surface of an adjacent lamella plate in closing relationship to the corresponding flow passage therebetween. A plurality of horizontally spaced orifices extend through the lamella plate at an elevation a short distance below the elevation of the leg portion in communication with a corresponding flow passage. Clarified liquid from the flow passage is directed through the orifices into an area above the lamella plate assembly in communication with the outlet trough. The orifices are sized so as to create a small pressure drop across the orifices to ensure substantially equal flow distribution through the flow passages.

The lamella plates are preferably formed with spacer lugs extending outward from the rear surfaces that contact a settling surface of an adjacent lamella plate, which spacer lugs are positioned at the lower and central portions of the rear surfaces. The lamella plates may be fabricated from an upper plate and a lower plate which are connected together. The upper portion of the lower plate is offset for nesting receipt of a lower portion of the upper plate and attached thereto by connecting pins formed on the lower portion of the upper plate that extend through openings formed in the offset portion of the lower plate. The lamella plates are preferably molded of a structural foam material.

The lamella plates are individually removable from the lamella plate assembly. This may be achieved by providing a side plate assembly positioned in facing relationship with each side edge of the lamella plates. The side plate assembly comprises a plurality of vertically extending side plate members that are attached to one another along the edges thereof. Each side plate member includes a flange portion that extends into the lamella plate assembly for supporting the lamella plates.

BRIEF DESCRIPTION OF THE DRAWINGS

FIG. 3 is an enlarged perspective view of an upper portion of one side of the lamella separator apparatus as shown in FIG. 1 with certain parts removed to show structural details.

FIG. 4 is a top plan view of a lamella plate constructed in accordance with a preferred embodiment of the invention.

FIG. 5 is a front elevational view of the lamella plate shown in FIG. 4.

FIG. 6 is a side elevational view of the lamella plate shown in FIG. 5.

FIG. 7 is an enlarged sectional view taken along line 7—7 in FIG. 5.

FIG. 8 is an enlarged sectional view taken along line 8—8 in FIG. 5.

FIG. 9 is an elevational view of a side plate member constructed in accordance with a preferred embodiment of the invention.

DESCRIPTION OF A PREFERRED EMBODIMENT

Figure 1:
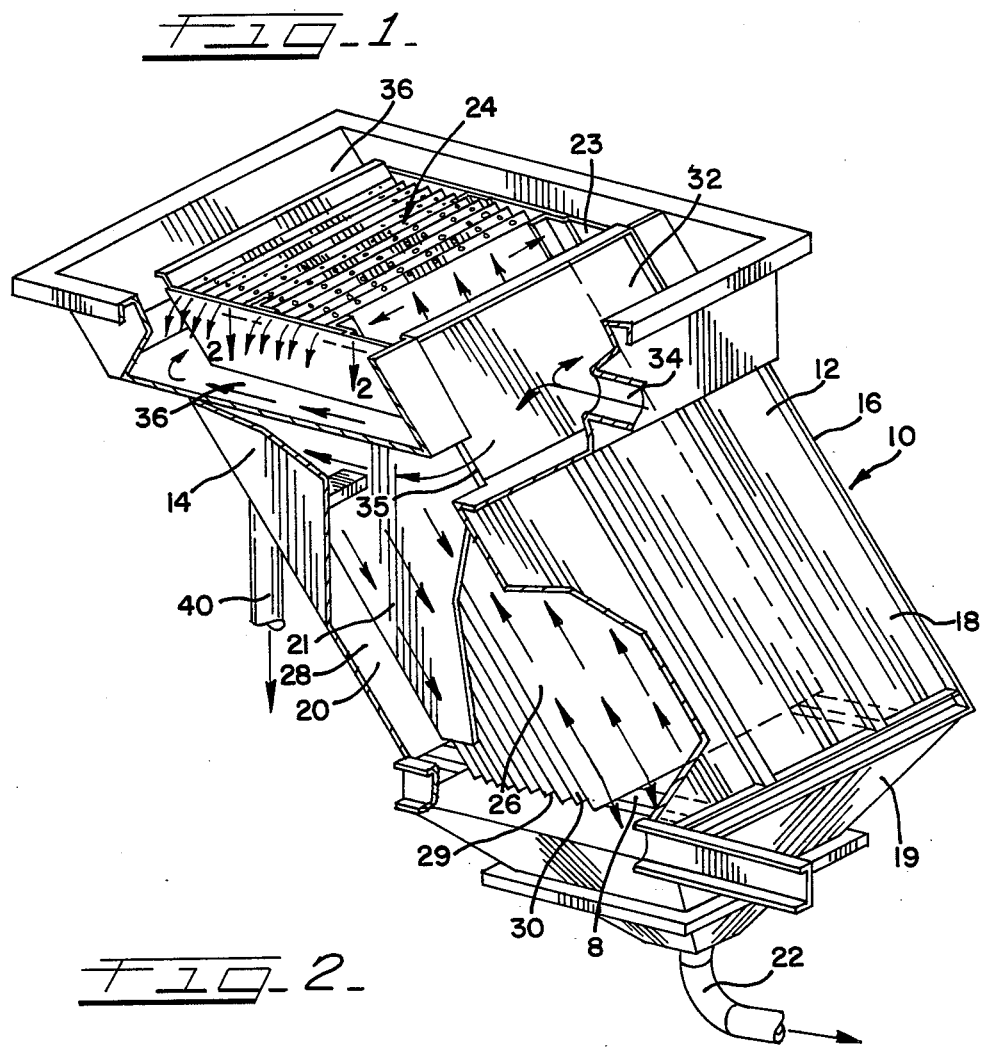
FIG. 1 is a perspective view of a lamella separator apparatus constructed in accordance with a preferred embodiment of the invention, partially cut away for clarity.

Referring to FIGS. 1 and 3, the sedimentation apparatus 10 in accordance with a preferred embodiment of the invention comprises a tank 12 consisting of side walls 14 and 16 and end walls 18 and 20. The lower portions of side walls 14 and 16 and end walls 18 and 20 terminate in a funnel-shaped sludge hopper 19 having a sludge discharge line 22. A lamella plate assembly 24 is supported within tank 12 having a plurality of spaced-apart inclined lamella plates 26 which extend between side plates 21 and 23. The construction of assembly 24 in accordance with the invention will be discussed in detail hereinbelow.

On the inside of each of the side walls 14 and 16 there is located a distribution chamber 28, with a bottom portion 29 thereof being at the same elevation of the lower edges of the lamella plates 26. The distribution chambers 28 communicate with the lower portions of flow passages 30 defined between adjacent lamella plates 28 under the lower edges of side plates 21 and 23. An inlet trough 32 is located on the outside of an upper portion of end wall 18 having an inlet pipe 34 in communication therewith. Inlet trough 32 communicates with the upper portions of distribution chambers 28 through passages 35. An outlet trough 36 extends above each of the distribution chambers 28 and along the entire length of end wall 20. The inner walls of trough 36 are defined by the upper portions of side plates 21 and 23 and the upper portion of end wall 20, which walls extend a short distance above the upper edges of lamella plates 28. An outlet opening 38 extends through the bottom of trough 36 in communication with an outlet pipe 40.

Referring to FIG. 3, each of the side plates 21 and 23 is preferably provided with a levelling plate 42 extending substantially along its entire length. Levelling plate 42 is secured to the side plate by suitable fasteners that extend through vertically elongated slots formed in the upper portion of the side plate to permit selective adjustment thereof to effectively level the upper edge of the side plate.

Referring to FIGS. 4–8, lamella plates 26, in accordance with a preferred embodiment of the invention, are rectangular plates, having rectangular inclined settling surfaces 44 and rear surfaces 45. The settling surfaces cooperate with a rear surface of an adjacent lamella plate to define flow passage 30 therebetween. Lamella plates 26 are formed with a leg portion 46 extending substantially perpendicular to an upper portion of the rear surface thereof substantially along the entire width thereof. A plurality of spaced-apart gussets 48 extend between the leg portion and the rear surface. The rear surface 45 is formed with a plurality of spacer lugs 50 extending therefrom a distance substantially equal to the length of leg portion 46. The spacer lugs are preferably positioned along a central portion and a lower portion of the rear surface 45. A plurality of horizontally spaced-apart orifices 51 extend through lamella plates 26 at an elevation a small distance below the elevation of the leg portion 46.

In accordance with a preferred embodiment of the invention, lamella plates 26 include an upper plate 52 and a lower plate 54, which plates are attached to one another. The upper portion of lower plate 54 is formed with an offset portion 56 for nesting receipt of a lower portion of upper plate 52, as best seen in FIGS. 6 and 8. Offset portion 56 is formed with a plurality of spaced-apart openings 58 and the lower portion of upper plate 52 is formed with cooperating connecting pins 60 that extend into a corresponding opening 58. Pins 60 are formed with bores 62 and recess areas 64 are formed around the openings 58. The pins 60 are of sufficient length to fill the recess areas after the plates are heat staked together in a well-known manner.

Figure 2:
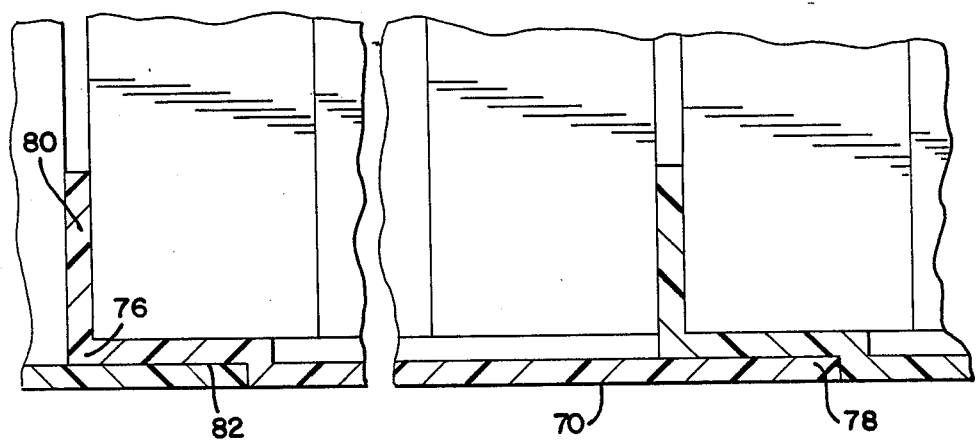
FIG. 2 is a horizontal sectional view taken through a portion of a side plate assembly constructed in accordance with a preferred embodiment of the invention.

In accordance with a preferred embodiment of the invention, the side plates 21 and 23 comprise a plurality of upstanding side plate members 70 that are positioned adjacent one another. Referring to FIGS. 2 and 9, side plate members 70 are of a parallelogram shape, defined by upper and lower edges 72 and 74 and side edges 76 and 78, having an acute angle of approximately fifty-five degrees. Side edge 76 is formed with a flange portion 80 generally perpendicular to side plate member 70, which extends along the entire length thereof. The portion 82 of side plate member 70, adjacent leg portion 80, is offset for nesting receipt of a portion of side edge 78 of an adjacent side plate member, as best seen in FIG. 2.

Referring to FIGS. 1 and 3, side plate members 70 are mounted in place within tank 22 to form side plates 21 and 23, such that the leg portions 80 extend inwardly. The plate members 70 are secured to the side walls 14 in a suitable manner as by brackets (not shown) extending therebetween. The side plate members 70 are oriented such that the upper and lower edges thereof are substantially horizontal and the side edges 76 and 78 are inclined at approximately a fifty-five degree angle. The spaced-apart flange portions 80 serve as separators for groups of lamella plates 26 as will hereinbelow become more apparent.

Lamella plate assembly 24 comprises a plurality of lamella plates 26 positioned between side plates 21 and 23 so as to define flow passages 30 therebetween. In accordance with a preferred embodiment of the invention, a group of approximately six lamella plates is positioned between the flange portions 80 of adjacent side plate members 70. In so doing, the outer edges of the leg portions 46 contact the settling surface of an adjacent lamella plate in closing relationship to the corresponding flow passage 30 therebetween. The spacer lugs 50 similarly contact the settling surface of the adjacent lamella plate to maintain the spaced relationship therebetween. The orifices 51 are located above the point of contact of the lamella plate and the leg portion of the adjacent plate, thereby providing communication between the flow passages 30 and an area above the lamella plate assembly 24. The lower edges of lamella plates 26 are supported on beams 84 mounted in tank 12.

As best seen in FIGS. 4 and 7, the outer corners of the leg portions 46 are cut out to permit receipt of the flange portions 80 thereinto.

The lamella plates 26 are preferably molded of a structural foam material, such as UVR-resistant polypropylene structural foam or an equivalent thereof.

The operation of the apparatus 10, constructed in accordance with the invention, will now be disclosed. The liquid containing suspended solids is directed into inlet trough 32 through inlet pipe 34, from which it flows through passages 35 into distribution chambers 28. The liquid is directed downwardly in chambers 28 and under side plates 21 and 23 uniformly into the lower portions of flow passages 30. As is well-known in countercurrent lamella sedimentation, as the liquid passes upwardly through the passages 30, settling of suspended solids on the settling surfaces 44 takes place. The liquid continues to flow upwards while the settled solids move down the settling surfaces. The settled solids are directed into sludge hopper 19 and exit the apparatus 10 through discharge line 22 for disposal.

The clarified liquid passes through the orifices 51 into the area above the lamella plate assembly 24 in tank 12 from which it flows over levelling plates 42, associated with each side plate 21 and 23, into outlet trough 36. The orifices 51 are sized and spaced-apart so as to create a small pressure drop thereacross to assure substantially equal flow distribution through the flow passages 30 thereby improving utilization of the whole settling surface for flow distribution. This also assures that laminar flow is maintained in the flow passages, which is essential to settling of flow particles, and eliminates shortcircuiting of liquid in the flow passages, so that higher unit flow rates can be achieved.

As alluded to hereinabove, it is periodically necessary to perform maintenance on the lamella plates 26, such as the cleaning or replacement thereof. The apparatus of the present invention permits easy removal of an individual plate or a group of plates and replacement thereof. This is accomplished by lifting the plate out of the lamella plate assembly 24 and either reinserting or replacing it with a new lamella plate by dropping said back in place between the side plates 21 and 23.

The preferred embodiment of the invention as described hereinabove shows but one form thereof. It will be obvious to those skilled in the art that it is not so limited, but is susceptible of various changes and modifications without departing from the spirit thereof as defined in the appended claims.

What is claimed is:

1. In an apparatus for separation of solids suspended in a liquid, said apparatus including a tank having a lamella plate assembly located within said tank defining a plurality of parallel inclined flow passages therein, an inlet distribution means for directing liquid to be treated into said tank and upwardly through said flow passages, and an outlet trough means extending transversely with respect to said flow passages for receiving clarified liquid from said flow passages; an improved lamella plate assembly, comprising: a plurality of spaced-apart inclined parallel lamella plates defining said flow passages therebetween, said lamella plates having a generally rectangular inclined settling surface and a rear surface; each of said lamella plates having a leg portion extending substantially perpendicular to an upper end portion of said rear surface substantially along the entire width thereof, said leg portion extending between adjacent lamella plates such that the outer edges thereof contact an adjacent settling surface in closing relationship to a corresponding flow passage therebetween; and a plurality of horizontally spaced-apart orifices extending through said lamella plates at an elevation below the elevation of said leg portions said orifices being in communication with a corresponding flow passage and with an area above said lamella plate assembly in communication with said outlet trough means.

2. The invention as defined in claim 1 wherein spacer lugs extend outwardly from the rear surfaces of each said lamella plate and contact a settling surface of an adjacent lamella plate.

3. The invention as defined in claim 2 wherein said spacer lugs are positioned at a lower portion and a central portion of said lamella plates.

4. The invention as defined in claim 1 wherein a plurality of spaced-apart gussets extend between said leg portion and said rear surface of each said lamella plate.

5. The invention as defined in claim 1 wherein each said lamella plate includes an upper plate and a lower plate which are connected to one another.

6. The invention as defined in claim 5 wherein an upper portion of said lower plate is offset for nesting receipt of a lower portion of said upper plate.

7. The invention as defined in claim 6 wherein said offset upper portion of said lower plate has a plurality of horizontally spaced openings formed therein and said lower portion of said upper plate has connecting pins formed thereon which extend into said openings.

8. The invention as defined in claim 1 wherein said lamella plates are molded of a structural foam material.

9. The invention as defined in claim 8 wherein said structural foam material is UVR-resistant polypropylene.

10. The invention as defined in claim 1 wherein said outlet trough means has an inner wall transverse to said flow passage having an upper edge above the elevation of said lamella plates over which clarified liquid flows into said outlet trough means.

11. The invention as defined in claim 10 wherein a vertically adjustable leveling plate means is mounted to said inner wall for leveling the upper edge thereof.

12. The invention as defined in claim 1 further comprising means to individually remove said lamella plates from said lamella plate assembly.

13. The invention as defined in claim 12 wherein said lamella plates are removably received between side plate members positioned in facing relationship with each side edge of said lamella plates.

14. The invention as defined in claim 13 wherein said side plate assembly includes a plurality of spaced-apart inclined flange portions that extend into said lamella plate assembly for supporting said lamella plates.

* * * * *